United States Patent
Bordaz et al.

(10) Patent No.: US 6,195,728 B1
(45) Date of Patent: Feb. 27, 2001

(54) DETECTION OF HOT POINTS IN A NON-UNIFORM MEMORY ACCESS MACHINE

(75) Inventors: Thierry Bordaz, Domène; Jean-Dominique Sorace, Lancey; Henri Raison, Grenoble, all of (FR)

(73) Assignee: Bull, S.A., Louveciennes (FR)

(*) Notice: Subject to any disclaimer, the term of this patent is extended or adjusted under 35 U.S.C. 154(b) by 0 days.

(21) Appl. No.: 09/088,370

(22) Filed: Jun. 2, 1998

(30) Foreign Application Priority Data

Jun. 2, 1997 (FR) .................................................. 97 06747

(51) Int. Cl.[7] .................................................. G06F 12/00

(52) U.S. Cl. .......................... 711/118; 711/121; 711/141; 711/147; 711/206; 365/236; 379/10

(58) Field of Search ............................ 365/236; 379/10; 380/24; 709/101, 102; 711/122, 141, 206, 147, 118

(56) References Cited

U.S. PATENT DOCUMENTS

| | | | |
|---|---|---|---|
| 4,068,304 | * 1/1978 | Beausoleil et al. | 395/500 |
| 4,845,615 | 7/1989 | Blasciak. | |
| 5,269,013 | * 12/1993 | Abramson et al. | 711/170 |
| 5,727,150 | * 3/1998 | Laudon et al. | 709/215 |
| 5,860,116 | * 1/1999 | Washington | 711/148 |
| 5,887,146 | * 3/1999 | Baxter et al. | 710/104 |
| 6,014,690 | * 1/2000 | VanDoren et al. | 709/215 |
| 6,035,377 | * 3/2000 | James et al. | 711/147 |

OTHER PUBLICATIONS

Lenoski D et al.: The Dash Prototype: Logic Overhead and Performance IEEE Transactions on Parallel and Distributed Systems, vol. 4, No. 1, Jan. 1, 1993 pp. 41–61, XP000381324.

Verghese B. et al.: "Operating System Support for Improving Data Locality on CC–NUMA Compute Servers", ACM Sigplan Notices, vol. 31, No. 9, Sep. 1996, pp. 279–289, XP000639239.

* cited by examiner

*Primary Examiner*—Do Hyun Yoo
*Assistant Examiner*—Mehdi Namazi
(74) *Attorney, Agent, or Firm*—Miles & Stockbridge P.C.; Edward J. Kondracki (57) ABSTRACT

A data processing machine with nonuniform memory access and cache coherency is constituted by a plurality of modules (10, 20, 40, 60), a given module (10) including a unit (6) to assure data coherence with other modules (20, 40, 60), characterized in that said unit (6) includes at least the following:

a first register (81, 101) intended to contain a first physical address of the memory, a second register (82, 102) intended to contain a second physical address of the memory, first means (90, 95, 111, 121, 88, 92, 108) for measuring a quantity of activity relating to the data whose addresses are included between said first physical address and said second physical address, a third register (83, 93, 109) intended to contain a threshold value for measuring said quantity of activity, second means (91, 94, 112, 122) for detecting the exceeding of said threshold value by the quantity of activity measured by the first means.

7 Claims, 7 Drawing Sheets

DETECTION OF HOT POINTS IN A NON-UNIFORM MEMORY ACCESS MACHINE

CROSS REFERENCE TO RELATED APPLICATION

The subject matter of this application is related to U.S. application Ser. Nos. 09/082,938 and 09/083,154, filed May 22, 1998, both in the name of Thierry Bordaz and Jean-Dominique Sorace and entitled respectively "A Process For Producing A Machine With Non-Uniform Memory Access And Cache Coherency And A Machine For Implementing The Process" and "Instrumentation Device For A Machine With Non-Uniform Memory Access" and assigned to the Assignee of the present invention.

FIELD OF THE INVENTION

The invention relates to a data processing machine with nonuniform memory access and cache coherency.

BACKGROUND OF THE INVENTION

In the field of information processing, it is possible to increase the power of a machine by increasing the number of processors that make it up. One type of machine, known as a symmetrical memory processor (SMP), allows different processors of the same machine to gain symmetrical access to the memory by means of a system bus. These machines have nonuniform memory access, to the extent that the access time to the memory is substantially the same for all the data accessed. However, the performance curve of such machines does not increase linearly as a function of the number of processors. A high number of processors means that the machine has more problems of accessibility to its resources available to it for executing applications. The consequence is that the performance curve is shifted considerably when the number of processors exceeds an optimal value, often estimated to be on the order of four. The state of the art has proposed various solutions to this problem.

One known solution consists of combining a plurality of machines into clusters to allow them to communicate with one another by means of a network. Each machine has an optimal number of processors, for instance four, and its own operating system. It establishes communication with another machine every time it performs processing on the data kept up to date by this other machine. The time required for these communications and the necessity of working with coherent data presents problems of latency for high-volume applications, such as distributed applications that require numerous communications. The latent period, or latency, is the length of time between the moment when a memory access request is sent and the moment when the response to this request is received.

Another known solution is that of non-uniform memory access (NUMA) machines. These are machines with non-uniform memory access (to use the English term), in the sense that the memory access time varies depending on the location of the data access. A machine of the NUMA type is made up of a plurality of modules, and each module includes an optimal number of processors and a physical portion of the total memory of the machine. Such a machine has nonuniform memory access because a module generally more easily gains access to a physical portion of the memory that it does not share with another module than to a physical portion it does share. Although each module has a private bus system connecting its processors and its physical memory, an operating system common to all the modules makes it possible to consider all the private bus systems as a single, unique bus system for the machine. Logical addressing assigns a residence site to a place in physical memory determined by a module. For a given processor, a distinction is made between access to a local memory portion, physically located in the same module as the processor, and accesses to a remote memory portion, physically located in one or more other modules than the one where the processor is located.

One particular type of NUMA machines is known as cache coherency non-uniform memory access (CCNUMA), that is, machines with cache coherency. A shared cache mechanism means that at a given moment a valid copy, that is, an updated copy, of this block is not necessarily located in its physical memory location of residence. One or more updated copies of the block can thus migrate from one module to another in accordance with applications requests and system calls. The physical memory, located in a given module, is the one to which the module in question can gain access fastest, because it can do so directly by means of its local system bus. The physical memory, at a distance in another module, is the one to which the module in question gains access the least rapidly, because it requires more or more transactions between modules. The physical memory that is local to the module in question includes a first portion especially assigned to the data blocks resident in this module, and a second portion especially assigned to the copies of blocks resident in other modules. The second physical memory portion constitutes a cache memory of the remote memory in the other modules.

A block that is resident in the first physical memory portion is not immediately available, if its contents are not an updated copy, which the case for example if one or more other modules are sharing this block, and if one of these other modules is holding an updated copy in terms of memory coherency. To manage the sharing of blocks residing in the first physical memory portion with other modules, the module in question has a local memory directory LMD (for the English term). The table or directory LMD is made up of a plurality of lines, each of which is intended to refer to one block residing in the module and shared with one or more other modules.

A block that does not reside in the first physical memory portion is immediately available if an updated copy of this block is accessible in the second physical memory portion. To manage the presence of updated copies in the second physical memory portion, the module in question has a remote memory table RCT (for remote cache table, in English). The table RCT is made up of a plurality of lines, each of which is intended to correspond with a place in the second physical memory portion, each place being intended to contain one block copy referenced by this line.

The importance of machines with nonuniform memory access and cache coherency is that each module works on data blocks that reside in a first portion of its local memory or on copies in a second portion of its local memory of blocks that reside in a first memory portion of another module. A given module then has no need to communicate with other modules in order to work on updated copies in such a way as to assure data coherence. In terms of execution, it is thus fundamentally of no significance whether a data block resides in one module or another, because each module, if necessary, relocates copies of blocks it needs to its local memory. However, to run the operating system common to all the modules or certain applications of the distributed type, it is possible that some data may often be useful to all the modules. By way of non-limiting example, these data have to do with process allocation tables, open file tables, or tables of set locks of shared resources. The coherence of these data has the risk of requiring numerous exchanges between modules and of thus interfering with the increase in performance expected from such machines. The problem is that it is difficult to evaluate a priori the extent to which the data shared by a plurality of modules threaten to impede machine performance, because this impedance can also depend on the way in which the machine is used while applications are being run on the machine. On the other hand, it would be useless to invest much expense for optimization for data are not likely to impede performance, with the risk that data whose location does threaten to impede performance more appreciably might be ignored.

SUMMARY OF THE INVENTION

The invention proposes a data processing machine with nonuniform memory access and cache coherency, constituted by a plurality of modules, one module in question including a unit to assure data coherence with other modules, characterized in that said unit includes at least the following:

- a first register intended to contain a first physical address in the memory,
- a second register intended to contain a second physical address in the memory,
- first means for measuring a quantity of activity relating to the data whose addresses are included between said first physical address and said second physical address,
- a third register intended to contain a threshold value for measuring said quantity of activity,
- second means for detecting the exceeding of this threshold value by the quantity of activity measured by the first means.

Measuring the quantity of activity relating to the data whose addresses are included between two physical addresses that make up a window in the memory space of the machine makes it possible to evaluate a latent period pertaining to that window, that is, the length of time between the sending of a request by a private cache memory of a processor and the availability of a corresponding response to this request in this private cache memory. The evaluation can be done on the basis of an absolute time or on the basis of a number of transactions.

BRIEF DESCRIPTION OF THE DRAWINGS

The invention will be better understood from the ensuing description of an exemplary embodiment, in conjunction with the drawings.

DESCRIPTION OF THE PREFERRED EMBODIMENTS

Figure 1:
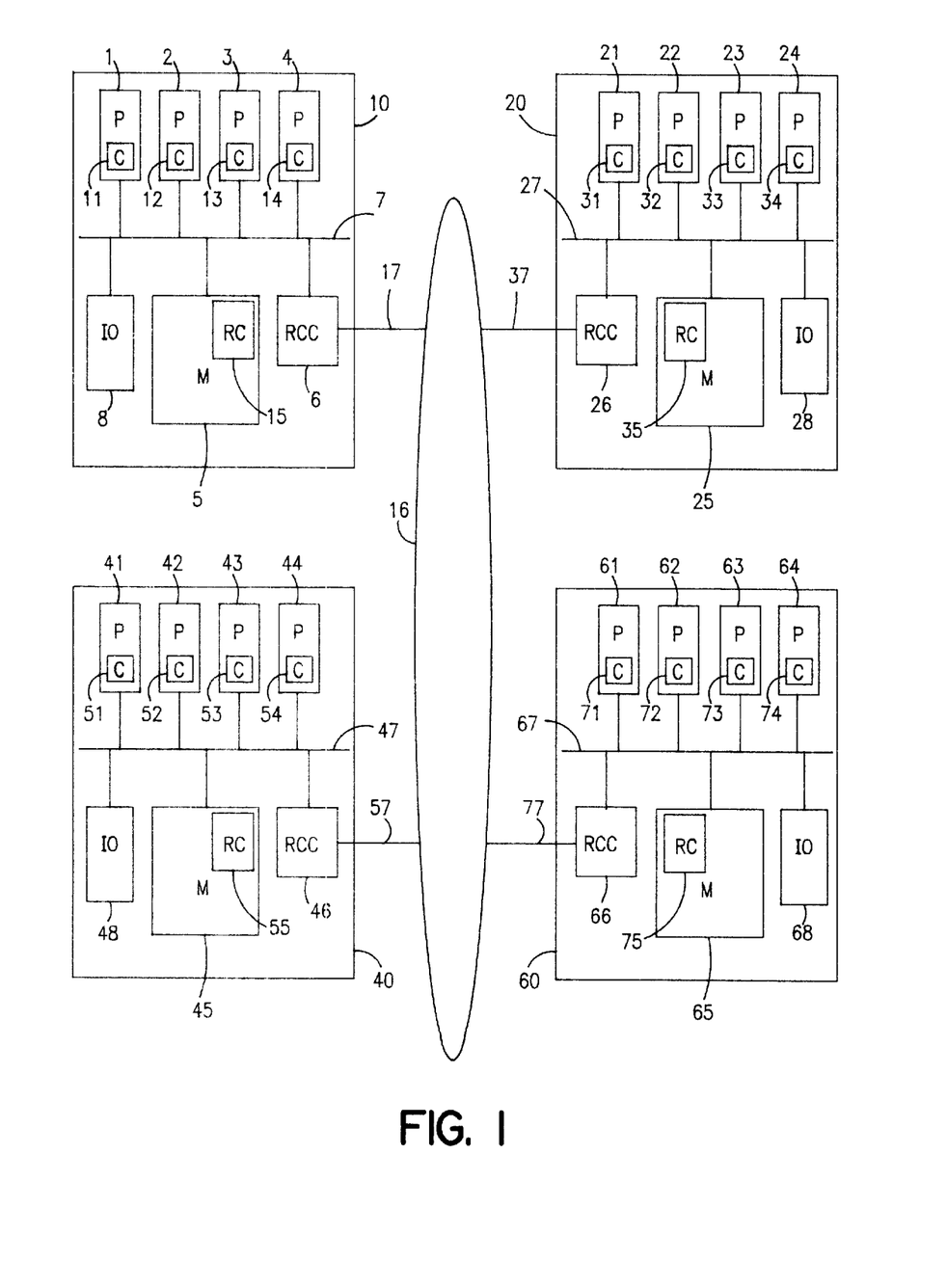
FIG. 1 shows a machine architecture with four modules.

FIG. 1 shows an example of machine architecture with nonuniform memory access, made up of four modules 10, 20, 40 and 60, which are interconnected by means of a ring 16. The following description of FIG. 1 is valid for any arbitrary number of modules greater than or equal to two. The connection among the modules can be made by means of one or more switched rings or by some other type of connections, such as grid or hypercube interconnections or auto-switcher interconnections (crossbars, in English), to cite only some of many known examples. Interconnecting the modules makes it possible to carry out transactions between modules that use the memory coherency protocol.

The module 10 includes four processors 1–4, a memory 5, and a unit 6 for connection to other modules by the ring 16. The various elements 1–6 are connected to one another by a bus system 7 in the module 10. The module 10 includes four processors 21–24, a memory 25, and a unit 26 for connection to other modules by the ring 16. The various elements 21–26 are connected to one another by a bus system 27 in the module 20. The module 40 includes four processors 41–44, a memory 45, and a unit 46 for connection to other modules by the ring 16. The various elements 41–46 are connected to one another by a bus system 47 in the module 40. The module 60 includes four processors 61–64, a memory 65, and a unit 66 for connection to other modules by the ring 16. The various elements 61–66 are connected to one another by a bus system 67 in the module 60. The unit 6, or 26, 46, 66, is connected to the ring 16 by means of a respective link 17, 37, 57 and 77.

Each processor 1–4, 21–24, 41–44, 61–64 has a respective private, internal and/or external cache 11–14, 31–34, 51–54, and 71–74. The module 10 also includes a remote access cache 15 or RC; the module 20 also includes a remote access cache 35; the module 40 also includes a remote access cache 55; and the module 60 also includes a remote access cache 75. To allow parametrizing the size of the cache 15, 35, 55, and/or 75, it is advantageous for it to be physically placed in a reserved zone of the memory 5, 25, 45, and 65, respectively, as shown in FIG. 1. In this case, the following description will assume that the memory 5', 25', 45', and 65', respectively, is made up of data blocks of the memory 5, 25, 45, and 65, respectively, that do not include any data blocks from the cache 15, 35, 55, and 75, respectively. In the case where the caches 15, 35, 55, 75 are embodied by physical components different from those of the memories 5, 25, 45, 65, the reference numerals 5', 25', 45', 65' should be understood to correspond to the reference numerals 5, 25, 45, 65.

Each processor 1–4, 21–24, 41–44, and 61–64 accesses data blocks contained in the memories 5', 25', 45', 65' by means of logical addresses of a single addressing space, without distinguishing whether the memories 5', 25', 45', 65' are local, that is, belonging to the same module of as the processor, or remote, belonging to a different module from the processor. In the module 10, it is the unit 6 that distinguishes whether the logical address corresponds to a local physical address of a block residing in the memory 5', or whether the logical address corresponds to a remote physical address of a block residing in one of the modules 20, 40, 60, for instance by means of high-order bits of the logical address that indicate the module where the memory being addressed is physically located, the low-order bits thus indicating the physical address within the module of residence. In this module 20, it is the unit 26 that distinguishes whether the logical address corresponds to a local physical address of a block residing in the modules 25', or whether the local address corresponds to a remote physical address of a block residing in one of the modules 40, 60, 10, for example by means of high-order bits of the local address that indicate the module where the memory being addressed is physically located; the low-order bits then indicate the physical address inside the module of residence, and so forth for the other modules. The high-order bits mentioned above make up a field A4 of the logical address. The data blocks thus accessed make up a set SM of memory shared by all the processors.

The example that follows, with respect to the processor 1, is equally valid for each of the other processors 2–4 with respect to the module 10 as well as 21–24 with respect to the module 20, 41–44 with respect to the module 40, and 61–64 with respect to the module 60.

The processor 1 processes a word contained in a data block B1 of the set SM by means of its private cache 11 in accordance with a known cache mechanism, such as the mechanism of direct correspondence, associated correspondence, or associative correspondence by block set, and these various mechanisms need not be described again here.

Let us simply recall that a cache memory essentially includes a fast-access memory and a table of correspondence, which are not shown in these drawings. In the case of a direct correspondence or direct mapping mechanism, a distinction is essentially made among three fields in the logical address of a word by decreasing order of significance of the bits. A first field A1 is called the tag or label field, a second field A2 is called the index field, and a third field A3 is called the address of the word in the data block containing that word. The first and second fields typically make up the logical address of the block B1. The index A2 points to a line in a table of correspondence that contains essentially two values. The first value is the tag A1' of a block B2 a physical image of which is addressed directly in the fast-access memory by this same index. The second value is a status code, which indicates whether the block B2 is held exclusively by the processor, or shared by another processor, and if so if its contents are valid or have been modified by this other processor.

If the label or tag A1 of block B1 is equal to the tag A1' of block B2, and if the status code indicates exclusivity or valid contents, block B2 is none other than block B1, physically contained in the fast-access memory, and the processor can directly process the words contained in this block by addressing them physically in the fast-access memory by means of the second and third fields of the logical address. If the status code indicates sharing, then the cache mechanism sends a signal S1 over the bus 7 to indicate a modification of the address of block B1, so as to modify the status code of this block in the cache memories that share it.

If the tag A1 of block B1 differs from the tag A1 of block B2, or if the status code indicates sharing and modified contents, then the processor cannot directly process the words contained in this block by physically addressing them in the fast-access memory by means of the second and third fields of the logical address. If the status code indicates exclusivity, then the cache mechanism sends a request Q2 for writing the block B2 into the shared memory, in order to free up space in the cache for the physical address indicated by the index A2, and then sends a request Q1 to read the block B1 in the shared memory, in order to load the block B1 into the cache at the physical address indicated by the index A2. If not, the cache mechanism sends a request Q1 for reading the block B1 in the shared memory, in order to load the block B1 into the cache at the physical address indicated by the index A2.

Figure 2:
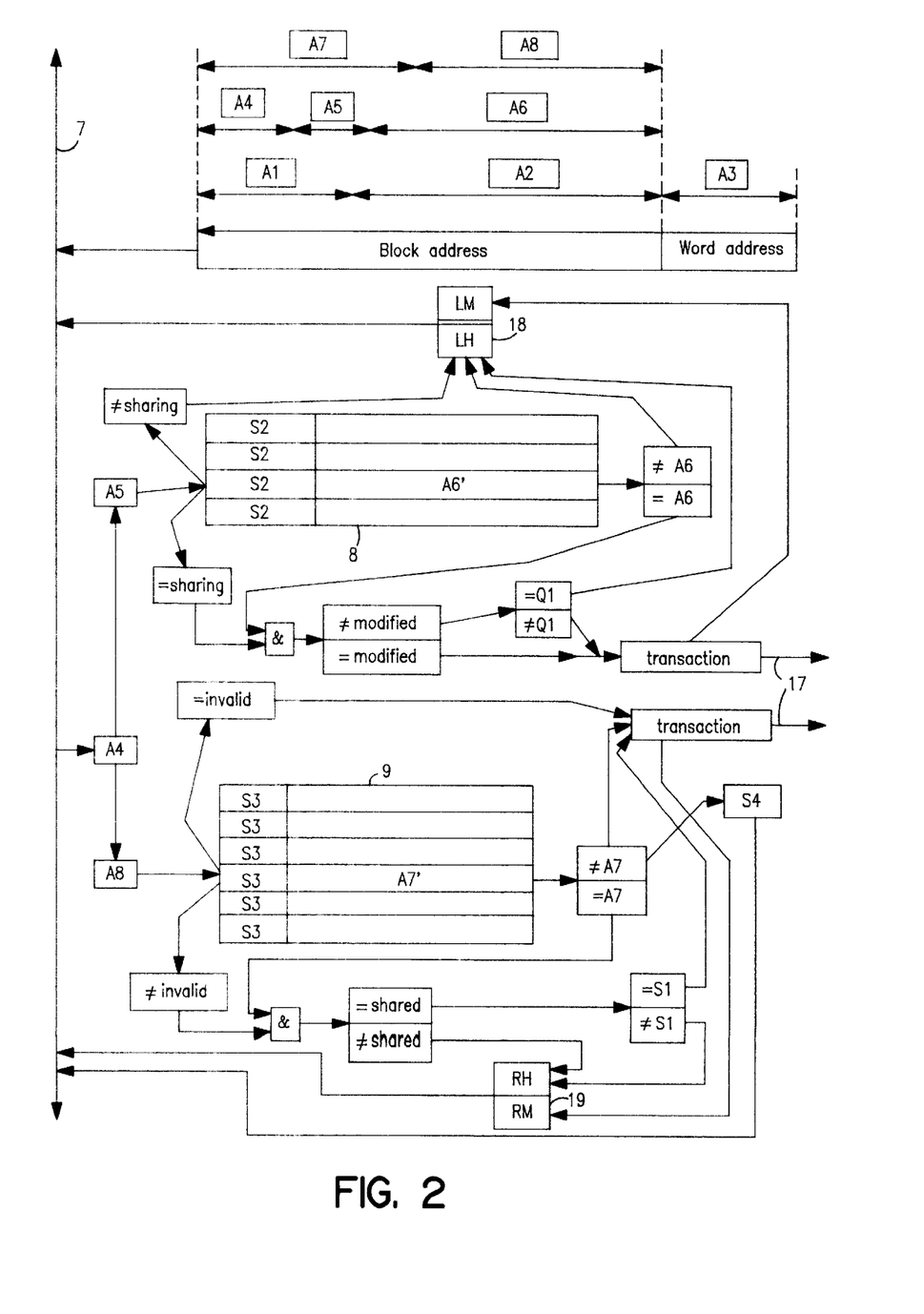
FIG. 2 shows certain details of the aforementioned unit, located in a given local module.

FIG. 2 shows a first level of details of the unit 6, with various hardware and logical elements employed when a block address made up of the fields A1 and A2 circulates a request Q1 or Q2 on the bus 7 by being linked to a signal S1. The unit 6 or RCC includes a table 8 or LMD, a table 9 or RCT, a register 18, and a register 19. The block address is also shared in three fields A4–A6, or in two fields A7 and A8. The field A4 is made up of higher order bits than those of the field A5, and the field A6 is made up of lower order bits than those of the field A5. The field A8 is made up of low-order bits, and the field A7 is made up of high-order bits, of higher quantity than that of the bits of the field A4, in such a way as to cover the field A4. The utility of fields A4–A8 will become apparent in the ensuing description. The logic for writing in the registers 18 and 19 as a function of the values of fields A4–A8 is represented by means of cells by which logic functions are processed. Each pair of cells containing the same term preceded by the equals sign (=) in the one and the inequality sign (≠) in the other, represents a comparator, the active result of which is a downstream logic stage. In each of the registers 18 and 19, one of the two possible states of a signal is written, represented symbolically by a pair of cells. The logic described can be realized by a microprocessor especially dedicated to the unit 6. Embodying this logic by means of physical circuits increases its speed of execution. The explanation with regard to FIG. 2 for the unit 8 considered to be local to the module 10 and remote from the module 20, 40, 60 is still valid for the units 26, 46, 66, if the reference numerals are replaced by circular permutation, specifically in accordance with the same circular permutation; that is, 8 is replaced by 28, 48 or 68, and 9 is replaced by 29, 49 or 60, depending on the module in question.

When the unit 6 seeks to send the signal S1, the request Q1 or the Q2 over the bus 7, it processes the block in question by a cache mechanism with the aids of its table 8, if the high-order bits in field A4 of the logic address indicate that the block in question resides physically in the memory 5', which is local to the module 10, and with the aid of the table 9 of the high-order bits of the tag indicate that the block in question resides physically in one of the remote modules 20, 40 or 60. The table 8 is indexed by m bits, making up a field A5 of the logic address that follows the high-order bits of the tag. The value of the number m directly determines the size of the table 8, in which the number of lines is equal to $2^m$. Each line in table 8 contains the low-order bits, making up a field A6, of the address logic of a block shared with one or more remote modules, and a status code S2. By way of example, the status code S2 is a multiple made up of presence bits and state bits. Each module 20, 40, 60 that is remote from the module 10 in which the block referenced by fields A5 and A6 resides is assigned a presence bit to indicate the presence or absence of sharing of this block with said remote module 20, 40, 60. The state bit or bits indicate whether this block is modified by a remote module. At a given moment, a single module holds the modified copy, which constitutes the most recently updated version of the block. In other words, if the status code S2 indicates a modification, only a single presence bit indicates sharing of this block with a remote module; this is the bit assigned to the module that contains the most recently updated version. The copy of the block in the module 10 is not updated, and the copies of the block in the other module are invalidated. If the status code does not indicate any modification, this signifies that the module 10 is holding an updated copy of the block, and that all of the modules whose presence bit is raised are holding an updated copy of the block, shared with the module 10. If no presence bit indicates the presence of sharing with a remote module, then the most recently updated copy of the block is found in module 10. The corresponding line in table 8 is in fact available for referencing another block, if needed. The low-order bits of the logic address of a block here are the bits that follow the aforementioned m bits, such that the concatenation of fields A4, A5 and A6 covers the concatenation of fields A1 and A2. Fields A5 and A6 make it possible to physically address the block in the local memory made up of the memory 5'.

If the line indexed by the n bits of the field A5 contains an address value different from that of the block processed, this means that no other module has access to it except module 10. Hence the processing of the block remains local in module 10, and there is no need to refer to table 8 because its updating in the memory 5' and optionally in the private caches 11–14 suffices. The unit 6 generates a local hit signal LH to indicate a successful local access (local hit in English), without any transaction with a remote module. The signal LH is written into the register 18. The same is true if no bit of the status code S2 indicates sharing with a remote module.

If the line in table 8, indexed by the m bits of field A5, contains an address value A6 equal to that of a block processed, and if at least one bit of the status code indicates sharing, this means that another module besides module 10, for instance module 20, has accessed it previously. The processing of the block then depends on its previous access by the remote module 20 and on the processing linked with this block. If the status code S2 indicates that the block S2 is currently being used in shared fashion, then the unit 6 determines that it is necessary to perform a transaction with the remote module 20.

If the status code S2 indicates that the block has been modified by a remote module, then a reading request Q1 requires a transaction with the remote module that holds a valid copy of the block, in order to relocate this value copy to the physical memory residing in module 10; the unit 6 then generates a local miss signal LM to indicate an unsuccessful access to local memory (local miss in English), which is accompanied by at least one transaction with a remote module. The signal LM is written in the register 18, and then the unit 6 updates the code S2 to a nonmodified status at the end of the transaction.

If the status code S2 does not indicate that the block has been modified by a remote module, then a reading request Q1 does not require transaction with any remote module, since the module 10 is holding a valid copy of the block, and the unit 6 then generates a local hit signal LH. Conversely, a signal S1 indicating modification or a request Q2 for writing the block does require a transaction with each remote module for which a code bit S2 indicates a presence, in such a way as to indicate to it that the copy of the block that it holds is not valid; the unit 6 then generates a local miss signal LM.

The generation of the signals LH and LM has been explained here in terms of a rewriting (write back, in English) cache mechanism. With a simultaneous-writing (write through, in English) cache mechanism, it will be understood that the request 20, 40, 60 in order to allocate a reserved addressing zone in memory 25, 45, 65 to a cache 35, 55, 75. The size of the caches 15, 25, 55, 75 is less than that of the memories 5, 35, 45, 65, so that this means only slightly lessens the size of the memory common to all the modules.

The unit 6 then looks at the status code S3 of the block referenced in table 9, that is, the block processed by the signal S1 or a request Q1, Q2. If the status code S3 indicates that the block is invalid, the unit 6 generates the same transactions and the same signals as if the line indexed by the n bits of field A8 contains a value for field A7' different from that of the processed block, as explained hereinafter.

If the status code S2 indicates that the block is not shared by any module, no transaction with a remote module is necessary and the unit 6 generates a remote hit signal RH to indicate successful access to remote memory (remote hit, in English) without any transaction with a remote module.

If the status code in table 9 indicates that the block is currently in shared use, then the unit 6 determines whether it is necessary to perform a transaction with the remote module 20. For the signal S1, a transaction is necessary, so that the fact that the block has been modified can be written into the status code S2 of the module 20 in which the block resides, and that the fact that the block is invalid can be written into the status code S3 of the module 40 or 50 which has a copy of the block in its cache 55, 75; the unit 6 then generates a remote miss signal RM to indicate an unsuccessful remote access (remote miss, in English) for which at least one transaction with a remote module is started. The unit 6 in its status code S3 declares that the block is modified. For the request Q2 for writing in the memory that is remote from module 10, no transaction is necessary, and the unit 6 generates a remote hit signal RH. For the reading request Q1, if the status code S3 in table 9 indicates that the contents of the Q1 requires no transaction because the module 10 is holding an updated copy of the block; and the unit 6 then generates a signal LH, and that the request Q2 or the signal S1 does require a transaction with at least one remote module 20 in order to put the updated copy of the block back into this module, and the unit 6 then generates a signal LM.

Table 9 is indexed by n low-order bits of the logical address that makes up a field A8. The value of the number n determines the size of table 9 directly, and the number of lines in it is thus equal to $2^n$. Each line of table 9 contains a status code S3 and the field A7 of the logical address, which references a block copy directly indexed in the cache 15 by the field A8. Hence the size of the cache 15 is $2^n$ blocks. The status code S3 is made up for instance of two bits for encoding three states Inv, Sha, Mod, which indicate the state of a block referenced in table 9 by field A8. The state Inv indicates that the referenced block is invalid; that it, the reference block has been modified by a remote module 20, 40 or 80. The state Sha indicates that the reference block is shared by at least one remote module 20, 40, 60. The state Mod indicates that the referenced block has been modified by the local module 10, and that its copy in the cache 15 is up to date.

If the line indexed by the n bits of field A8 contains a value of field A7' equal to that of the block processed, this means that the block residing in some other module that the mode 10, for example in the module 20, has been copied into the cache 15 that is common to the processors 1–4. The size of the cache is dimensioned so as to contain $2^n$ blocks referenced in table 9. Since the size of table 9 is parametrizable by the selection of the value of n, the same is true for the size of the cache 15. One valuable means for enabling this parametrizability is to remove a reserved addressing zone from memory 5 and allocate it to the cache 15. This means is also employed in each remote module block in module 10 are valid, no transaction is necessary, and the unit 6 then generates a remote hit signal RH; if the status code in table 9 indicates that the contents of the block in module 10 are invalid, a transaction is necessary in order to update the contents of the block in module 10, and the unit 6 then generates a remote miss signal and at the end of the transaction declares in its status code S3 that the block is valid. The generation of the signals RH and RM has been explained here in terms of a write back cache mechanism. With a simultaneous-writing cache mechanism (write through, in English), it is sufficient to modify the logic described in such a way that the signal S1 and the request Q2 require a transaction with the remote module 20, 40, 60 in order to update the block, and then the unit 6 generates a signal RM, and such that the request Q1 does not require any transaction, because the contents of the block are systematically updated.

If the line indexed by the n bits contains an address value different from that of the processed block, this means that the block addressed logically in the cache 15 by the indexing of the table 9 is different from the block processed.

It is then necessary to replace the block referenced in the table 9 with the processed block. The unit 6 then generates a signal RM. The unit 6 also in that case generates a signal S4 to indicate a replacement, in the cache 15, of the block listed in the directory by the block processed. The signal S4 is sent over the bus 7 in order to invalidate the block, listed in the directory in the cache 15, in the private caches 11–14, because the table 9 can no longer assure the coherence of this block. The unit 6 also informs the unit 26, 46 or 66 of the residence module that it will no longer reference the block, in such a way that the unit 26, 46 or 66 decreases the presence bit corresponding to the module 10 in the line of the table 28, 48 or 68 where the block was referenced. The unit 6 then performs an updating of table 9 by means of a transaction with the remote modules 20, 40 and 60, in order to relocate the processed block at a physical place logically addressed in the cache 15 by the indexing of the table 9. The transaction consists essentially of sending a reading request to the remote module 20, 40 or 60 where the block resides. For the sake of simplicity, let it be supposed for example that the module where the block resides is the module 20.

Figure 3:
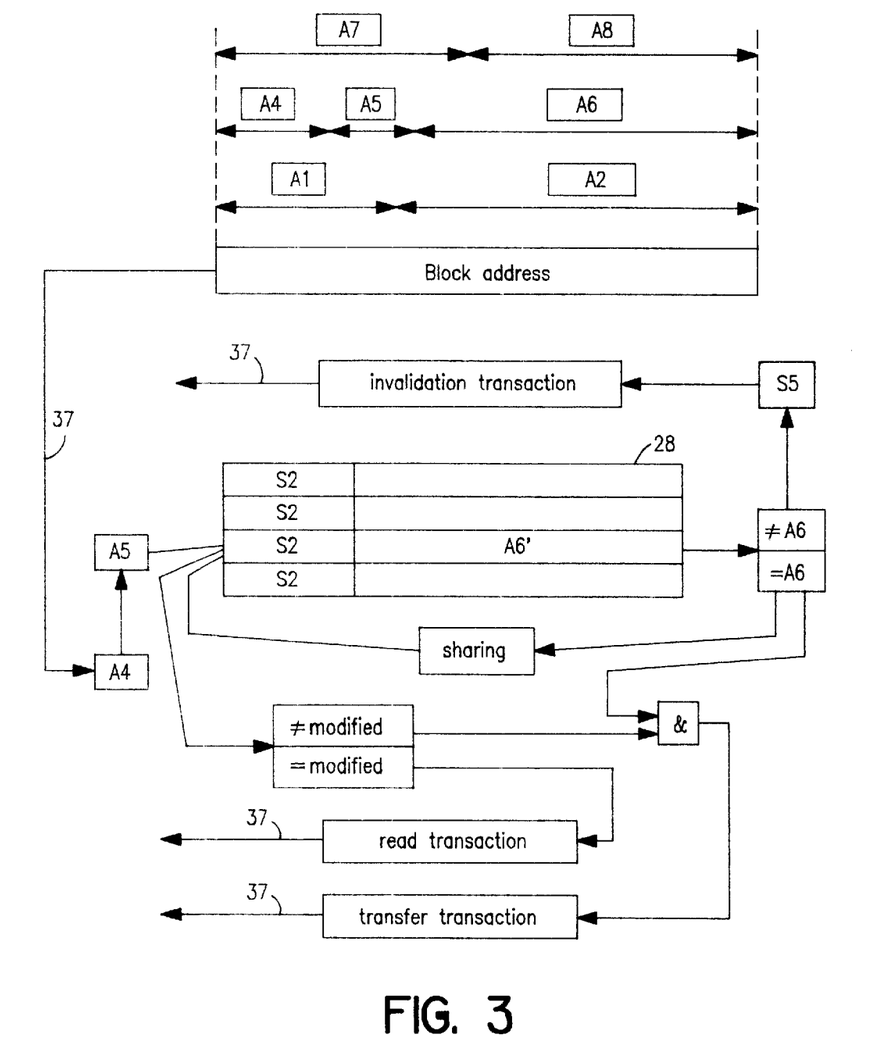
FIG. 3 shows certain details of the aforementioned unit located in a given remote module.

FIG. 3 shows a second level of details of the unit 6, 26, 46, 66, with the hardware and logical elements employed when a block address made up of fields A1 and A2 arrives at the module where this block resides, having originated in other modules, via the link 17, 37, 57, 77. The remarks made in the beginning of the introduction to FIG. 2 are valid for FIG. 3 as well. In particular, the reference numerals used in FIG. 3 pertain to the unit 26, to make the ensuing description simpler.

If the processed block is listed in the directory in table 28, its status code S2 is updated, to indicate that the block is shared by the module 10. If the status code S2, in the line in table 28 listing the processed block, indicates that the block has not been modified by any other module 40, 60, then the unit 26 transmits a copy of the block to the unit 6. This copy is obtained by reading in the memory 25 or in one of the caches 31–34. If the status code indicates that the block has been modified, the unit 26 sends a reading request to whichever of the modules 40, 60 has the most recently updated version of the block. The unit 46, 66 that has the most recent copy sends the processed block to the unit 6 of module 10 and to the unit 26 of module 20. The unit 26 updates its local memory 25', and its shared status code S2. The unit 6 lists the block in the directory in the table 9 with a shared and unmodified status code, and write the block into the cache 15. Next, the unit 6 sends an acknowledgement to the unit 26, which adds the sharing with the module 10 to its status code S2.

If the processed block is not listed in the table 28, the unit 26 generates a signal S5 to indicate that the block listed is to be replaced by the processed block. If the status code S2 of the listed block indicates that this block has been modified by a module 10, 40 or 60, the unit 26 sends a reading request to whichever of the modules 10, 40, 60 holes the most recently updated version of the block. The unit 6, 46, 66 whose code S3 of the referenced block indicates that its copy of the block has been modified sends a copy of the block to the unit 26 of the module 20 to update its local memory 25'. The signal S5 is sent to the unit or units 6, 46, 66 that have a reference to the block at a line of their table 9, 49, 69, in such a way that each one updates its code S3 to invalid status. Next, the unit 26 lists the processed block in the directory in its table 28 with a status code S2 that indicates that the block is shared with the module 10 and is unmodified. Finally, the unit 26 sends the contents of the processed block to the unit 6, which lists the block in its table 9 with a non-invalidated, shared, and unmodified status code, and writes the block in the cache 15. If the status code S2 of the block listed in table 28 does not indicate that this block has been modified, then the signal S5 is sent to the unit or units 6, 46, 66 that reference the block at a line of their table 9, 49, 69, in such a way that each one updates its code S3 to invalid status. Next, the unit 26 lists the processed block in the directory in its table 28 with a status code S2 that indicates that the block is shared with the module 10 and is unmodified. Finally, the unit 26 sends the contents of the processed block to the unit 6, which lists the block in its table 9 with a non-invalidated, shared, and unmodified status code, and writes the block in the cache 15.

The above explanation pertains to a direct-correspondence cache mechanism. The implementation of the teaching thus procured should not present any insurmountable problem to one skilled in the art seeking to use other known cache mechanisms, such as those with associative correspondence or with associative correspondence per block set in all or some of the private caches 11–14, 31–34, 41–44, 61–64, and tables 8, 9, 28, 29, 48, 49, 68, 69.

In particular, it is valuable to use an associative correspondence for all the block in the tables 8, 28, 48, 68. For the same number of bits m comprising the field A5, an associative correspondence per block set, for example with four blocks, requires four times as much memory for table 8 as direct correspondence, because each line can then reference four blocks, each with its own status code S2. However, in direct correspondence, when a block has to be referenced at a line indexed by its field A5, there is no problem if the line is available, but a replacement must be made if the line is already referencing another block, whose field A6' is different from the field A6 of the block to be referenced. A line is available, if no block is referenced there, or if the status code S2 of the block already referenced does not indicate any presence of sharing with a remote module, in which case the reference to such a block is deemed invalid. The chances that the reference of an already-referenced block will be invalid before a new block is to be referenced are thus increased, compared with a direct-correspondence mechanism. If a replacement is necessary because of the unavailability of a line, the replacement can be done for the oldest block. or the block with the fewest presence bits raised in its status code S2. This reduces the likelihood that some other module will immediately ask again to reference a block that has just been replaced.

Figure 4:
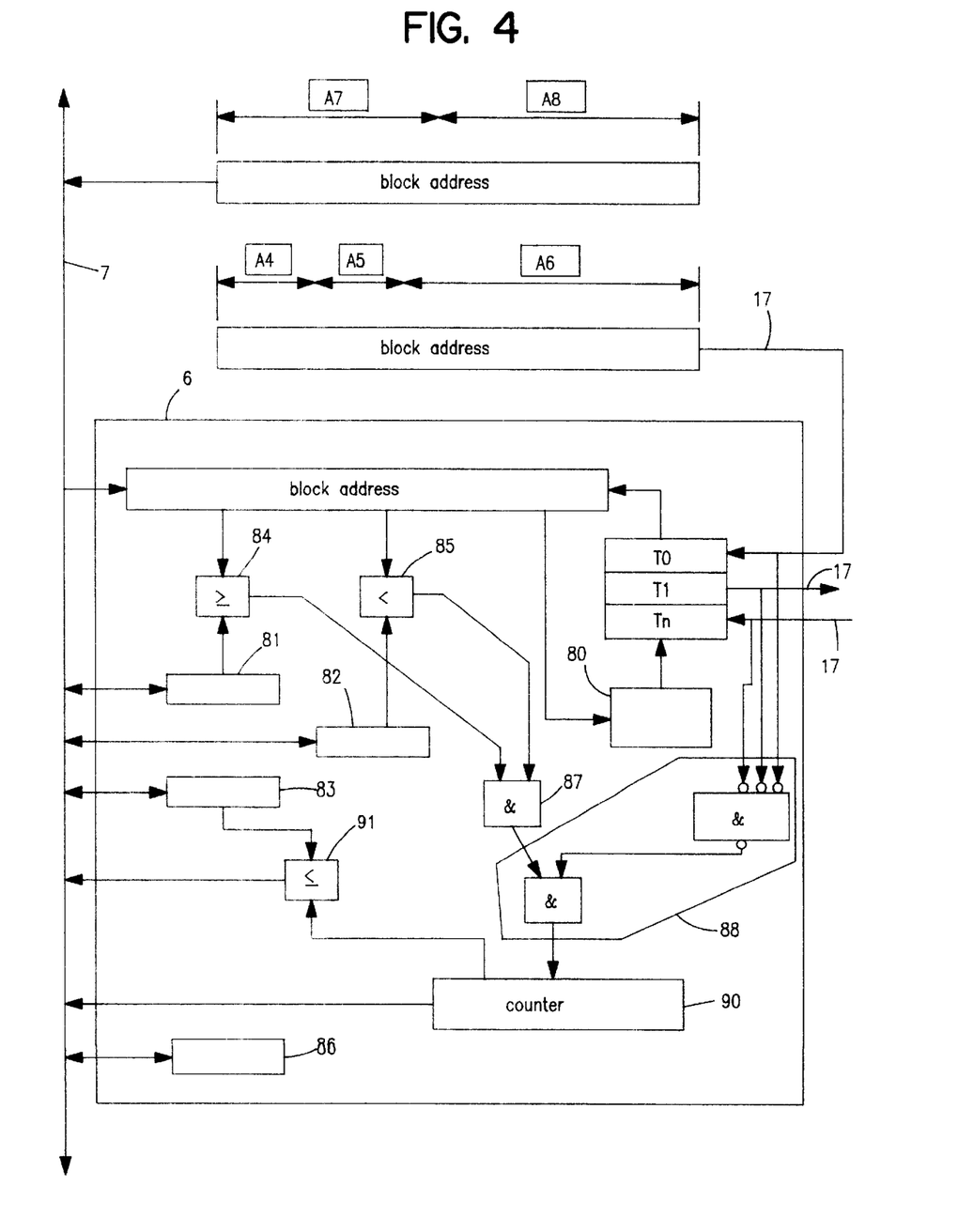
FIGS. 4–6 show other details of this unit for the implementation of the invention.

FIG. 4 shows additional details of the unit 6. One register 81 is intended to contain a first logical address within the memory space of the machine. One register 82 is intended to contain a second logical address within the memory space of the machine. The first logical address, or header address, is less than the second logical address, or footer address. When the unit 6 generates a transaction relating to a block address that has been retrieved previously from the bus 7 or the link 17, this address is compared with the contents of the register 81 by means of a comparator 84, and with the contents of the register 82 by means of a comparator 85. If the block address is more than the contents of the register 81 and less than the contents of the register 82, a logic circuit 87 signals an appearance of the block at a window in the machine memory that is demarcated by this header address and footer address.

It has been seen in conjunction with FIGS. 2 and 3 that after a block address has been retrieved, various logic elements of the unit 6 generate one or more transactions as a function of the contents of tables 8 and 9. The various logic elements are symbolically combined into one logic circuit 80, so as not to make the drawing needlessly complicated. Each time the unit 6 sends or receives a transaction over the link 17, a logic circuit 88 increments a counter 90, if the logic circuit 87 signals an appearance of the block at a window in the machine memory that is demarcated by this header address and footer address.

The contents of the counter 90 thus represent a quantity of activity regarding the data addressed in the window demarcated by this header address and footer address, in terms of the number of transactions between the local module 10 and the remote modules 20, 40, 60. In this case, a "heat" of this window is defined as being a size proportional to this quantity of activity.

A register 83 is intended to contain a threshold value, in terms of the number of transactions between the local module 10 and the remote modules 20, 40, 60. A comparator 91 sends an interrupt signal over the bus 7 when the contents of the register 83 are less than the contents of the counter 90.

Figure 5:
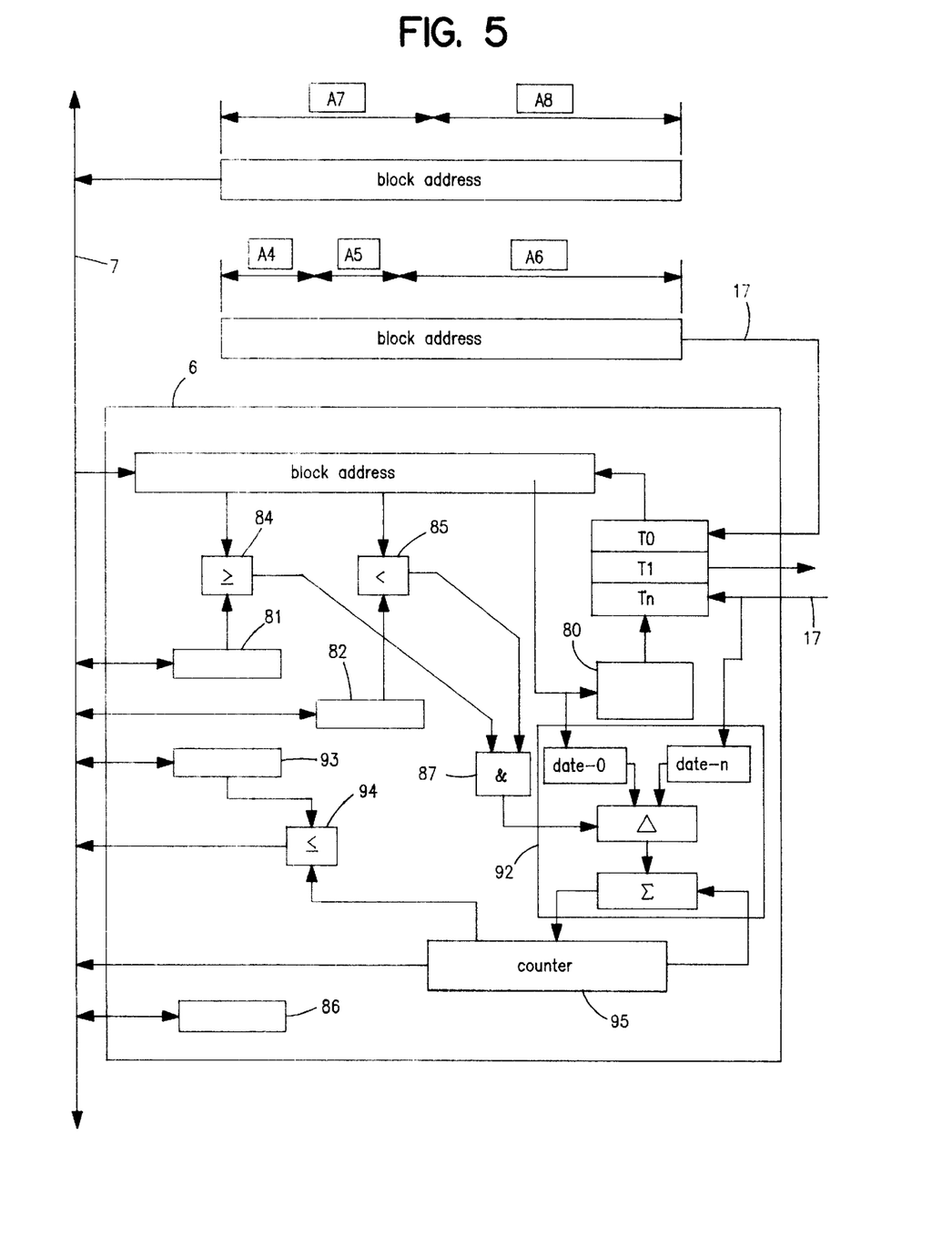

FIG. 5 shows additional details of the unit 6. One register 81 is intended to contain a first logical address within the memory space of the machine. One register 82 is intended to contain a second logical address within the memory space of the machine. The first logical address, or header address, is less than the second logical address, or footer address. When the unit 6 generates a transaction relating to a block address that has been retrieved previously from the bus 7 or the link 17, this address is compared with the contents of the register 81 by means of a comparator 84, and with the contents of the register 82 by means of a comparator 85. If the block address is more than the contents of the register 81 and less than the contents of the register 82, a logic circuit 87 signals an appearance of the block at a window in the machine memory that is demarcated by this header address and footer address.

It has been seen in conjunction with FIGS. 2 and 3 that after a block address has been retrieved, various logic elements of the unit 6 generate one or more transactions as a function of the contents of tables 8 and 9. The various logic elements are symbolically combined into one logic circuit 80, so as not to make the drawing needlessly complicated. When at a date-n the unit 6 receives a most recent transaction Tn over the link 17, resulting in retrieval of the block address at a date-0, an arithmetic unit 92 subtracts the date 0 from the date n if the logic circuit 87 signals an appearance of the block at a window in the machine memory that is demarcated by this header address and footer address. The arithmetic unit 92 then adds the result obtained to the contents of the counter 95.

The contents of the counter 95 thus represent a quantity of activity regarding the data addressed in the window demarcated by this header address and footer address, in terms of cumulative latent periods of transactions between the local module 10 and the remote modules 20, 40, 60. In this case, a "heat" of this window is defined as being a size proportional to this quantity of activity.

A register 93 is intended to contain a threshold value, in terms of cumulative latent periods of transactions between the local module 10 and the remote modules 20, 40, 60. A comparator 94 sends an interrupt signal over the bus 7 when the contents of the register 93 are less than the contents of the counter 95.

The registers 81, 82, 83 and 93 are read- and write-accessible via the bus 7. The counters 90, 95 are read-accessible only, over the bus 7. A check register 86 is read- and write-accessible to allow a process, run in the module 10, to handle reading of the counters 90, 95, as a function of low and high states, for example five bits numbered sequentially from "0" to "4". The low state of the "0" bit prevents any incrementation of the counter 90 by the logic circuit 88, or of the counter 95 by the arithmetic unit 92. The high state of the "0" bit does not prevent the incrementation of the counter 90 by the logic circuit 88, or of the counter 95 by the arithmetic unit 92. The low state of the "1" bit prevents any interrupt generated by the comparators 91, 94 from intervening in the incrementation of the counter 90 by the logic circuit 88, or of the counter 95 by the arithmetic unit 92. The high state of the "1" bit prevents any incrementation of the counter 90 by the logic circuit 88, or of the counter 95 by the arithmetic unit 92, following an interrupt generated by the comparator 91, 94. The low state of the 11211 bit deactivates any generation of an interrupt by the comparators 91 and 94. The high state of the "2" bit activates the generation of an interrupt by the comparators 91 or 94 when the contents of the counter 90 exceed the contents of the register 83, or when the contents of the counter 95 exceed the contents of the register 93. The low state of the "3" bit does not intervene in the evolution of the counter 90. The high state of the "3" bit sets the contents of the counter 90 to a zero value. The low state of the "4" bit does not intervene in the contents of the counter 95. The high state of the "4" bit sets the contents of the counter 95 to a zero value.

When the unit 6 retrieves a block address that is circulating on the bus 7, a distinction is essentially made among three classes of the space in the machine memory: one space with non-shared access, one space with access shared for reading, and one space shared for writing and/or reading.

For a block belonging to the non-shared access space, no transaction between the local module 10 and a remote module 20, 40, 60 is necessary, because the module 10 is then the only one holding an updated copy of the block. A window in the machine memory demarcated by the aforementioned header and footer addresses and integrally contained in this space is called "cold", because its heat, defined in conjunction with FIG. 4 or FIG. 5, is zero.

For a block belonging to the space for shared access for reading and/or writing, one or more transactions between the local module 10 and a remote module 20, 40, 60 are necessary, in particular if the module 10 is not holding an updated copy of the block. A window in the machine memory demarcated by the aforementioned header and footer addresses with an intersection other than zero with this space is called "hot", because its heat, defined in conjunction with FIG. 4 or FIG. 5, is positive.

The hardware structure of the unit 6 that has just been described makes it possible to employ various software processes in order to measure the heat of a window in the machine memory.

Let us take as an example a process that measures the heat proportional to a quantity of activity, in terms of the number of transactions. Bits 0 to 4 of the register 86 are initially set to a high state, to force the contents of the counter 90 to a zero value. A header address is written in the register 81, and a footer address is written in the register 82, in such a way as to define a window for which the transactions relating to the data blocks addressed in this window will be counted. A threshold value is written in the register 83, to determine a maximum quantity of activity attained by the counter 90. The "0" bit of register 86 is set to a low state, to activate the counting of the transactions relating to the window determined, and simultaneously a date ddc at which the "0" bit of register 86 is set to the low state is memorized. On receiving the interrupt generated by the comparator 91, a counting duration is calculated, in machine clock cycles, as being the difference between the date ddc and a date dfc when the interrupt was generated. The heat of the window is calculated by dividing the contents of the counter 90 by the counting duration. If no interrupt generated by the comparator 91 at a maximum counting date dmc is received, then a counting duration is calculated, in machine clock cycles, as being the difference between the date ddc and the date dmc. The heat of the window is calculated by dividing the contents of the counter 90 by the counting duration. The heat thus calculated is homogeneous with a quantity of transactions per unit of time.

Let us take as an example a process that measures the heat proportional to a quantity of activity, in terms of the cumulative latent periods of transactions. Bits 0 to 3 and 5 of the register 86 are initially set to a high state, to force the contents of the counter 95 to a zero value. A header address is written in the register 81, and a footer address is written in the register 82, in such a way as to define a window for which the transactions relating to the data blocks addressed in this window will be counted. A threshold value is written in the register 93, to determine a maximum quantity of activity attained by the counter 95. The "0" bit of register 86 is set to a low state, to activate the accumulation of latent periods relating to the window determined, and simultaneously a date ddc at which the "0" bit of register 86 is set to the low state is memorized. On receiving the interrupt generated by the comparator 94, a counting duration is calculated, in machine clock cycles, as being the difference between the date ddc and a date dfc when the interrupt was generated. The heat of the window is calculated by dividing the contents of the counter 95 by the counting duration. If no interrupt generated by the comparator 94 at a maximum counting date dmc is received, then a counting duration is calculated, in machine clock cycles, as being the difference between the date ddc and the date dmc. The heat of the window is calculated by dividing the contents of the counter 95 by the counting duration. The heat thus calculated is an a dimensional number.

If the unit 6 includes the counter 90 and the counter 95, then let us take as an example a process that measures the heat proportional to a quantity of activity, in terms of the mean duration of one transaction. Bits 0 to 5 of the register 86 are initially set to a high state, to force the contents of the counters 90 and 95 to a zero value. A header address is written in the register 81, and a footer address is written in the register 82, in such a way as to define a window for which the transactions relating to the data blocks addressed in this window will be counted. A threshold value is written in the register 83 and a threshold value is written in the register 93, to determine a maximum quantity of activity attained by the counter 90 or the counter 95. The "0" bit of register 86 is set to a low state, to activate the counting of transactions relating to the window determined, and simultaneously a date ddc at which the "0" bit of register 86 is set to the low state is memorized. On receiving the interrupt generated by the comparator 91 or by the comparator 94. The heat of the window is calculated by dividing the contents of the counter 95 by the contents of the counter 90. If no interrupt generated by the comparator 91 or by the comparator 94 at a maximum counting date dmc, if the contents of the counter 90 are zero, the heat of the window is calculated as zero. If the contents of the counter 90 are not zero, the heat of the window is calculated by dividing the contents of the counter 95 by the contents of the counter 90. The heat thus calculated is homogeneous with a time.

The unit of evaluation of the heat is of little significance in the sense that the goal is not to determine an absolute heat of the window but rather to compare the heats of different windows within the same unit, in such a way as to determine the hottest window or windows. In general, the heat of a window is considered to be a magnitude that is relatively stable over time. Taking one of the examples given above, it will suffice to repeat the process for various windows, each determined by the particular values arrayed in the registers 81 and 82.

Figure 6:
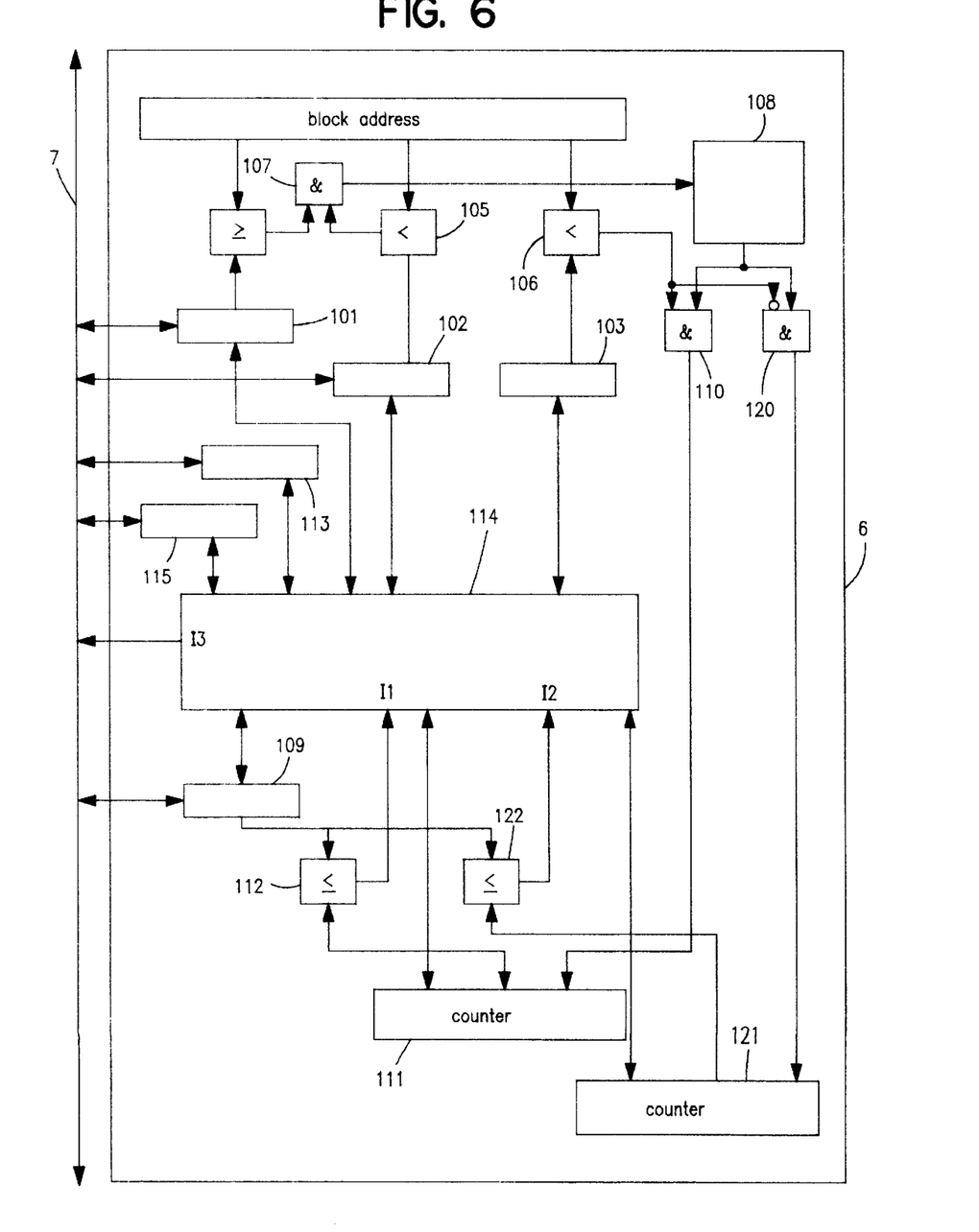

FIG. 6 shows details of the unit 6 for obtaining the hottest window among a plurality of others, without requiring any process run from outside the unit 6. A register 101 is intended to contain a first logical address within the memory space of the machine. A register 102 is intended to contain a second logical address within the memory space of the machine. The first logical address or header address is less than the second logical address or footer address. When the unit 6 generates a transaction relating to a block address, previously retrieved from the bus 7 or the link 17, this address is compared with the contents of the register 101 by means of a comparator 104, and with the contents of the register 102 by means of a comparator 105. If the block address is greater than the contents of the register 101 and less than the contents of the register 102, then a logic circuit 107 signals an appearance of the block in a window in the machine memory, called the autofocus window, which are demarcated by this header address and this footer address. The logic circuit 107 validates a logic circuit 108, identical to the logic circuit 88, to send a signal upon each transaction relating to a block appearing in this autofocus window, or identical to the logic circuit 92 to send a latent period value relating to a block appearing in this autofocus window. A register 103 is intended to contain a third logical address, which is included between that contained in the register 101 and that contained in the register 102. The block address retrieved by the unit 6 is compared with the contents of the register 103 by means of a comparator 106.

The register 103 defines two subwindows of this autofocus window. A logic circuit 110 validates the signals generated by the logic circuit 108 regarding the addresses of a first subwindow of addresses greater than the contents of the register 101 and less than the contents of the register 103. A logic circuit 120 validates the signals generated by the logic circuit 108 regarding addresses of a second subwindow with addresses greater than the contents of the register 103 and less than the contents of the register 102.

A counter 111 is intended to accumulate the signals generated by the logic circuit 108 and validated by the logic circuit 110. The contents of the counter 111 thus represent a quantity of activity regarding the data addressed in the first subwindow.

A counter 121 is intended to accumulate the signals generated by the logic circuit 108 and validated by the logic circuit 120. The contents of the counter 121 thus represent a quantity of activity regarding the data addressed in the second subwindow.

A register 109 is intended to contain a threshold value, in terms of the quantity of activity as defined beforehand. A comparator 112 sends a signal I1 to a sequencer 114, if the contents of the register 109 are less than the contents of the counter 111. A comparator 122 sends a signal I2 to the sequencer 114 if the contents of the register 109 are less than the contents of the counter 121. The mode of operation of the sequencer 114 will be explained in conjunction with FIG. 7.

A register 115 is intended to contain a minimal size value for the autofocus window, a value which is calculated as the difference between the contents of the registers 101 and 102.

The registers 101, 102, 109 and 115 are read- and write-accessible over the bus 7 and by the sequencer 114. The counters 111, 121 are read- and write-accessible by the sequencer 114. A check register 113 is read- and write-accessible to allow handling sequences executed by the sequencer 114, as a function of low and high states of seven bits, for example, sequentially numbered from "0" to "6". The high state of the "0" bit prevents any incrementation of the counters 111 and 121 by the logic circuit 108. The low state of the "0" bit does not prevent incrementation of the counters 111 and 121 by the logic circuit 108. The low state of the "1" bit prevents any interrupt generated by the sequencer 114 from intervening in the incrementation of the counters 111 and 121 by the logic circuit 108. The high state of the "1" bit prevents any incrementation of the counters 111 and 121 by the logic circuit 108, following an interrupt generated by the sequencer 114. The low state of the "2" bit deactivates any generation of an interrupt by the sequencer 114. The high state of the "2" bit activates the generation of an interrupt by the sequencer 114 when the contents of the register 115 exceed the difference between the contents of the registers 102 and 101. The low state of the "3" bit does not intervene in the evolution of the counters 111 and 121. The high state of the "3" bit sets the contents of the counters 121 and 122 to a zero value. The states of the "4" and "5" bits encode a divisor value in accordance with a power of two exponent ranging between zero and three. The low state of the "6" bit indicates that the size of the autofocus window is greater than the value contained in the register 115. The high state of the "6" bits indicates that the size of the autofocus window is less than the value contained in the register 115.

Figure 7:
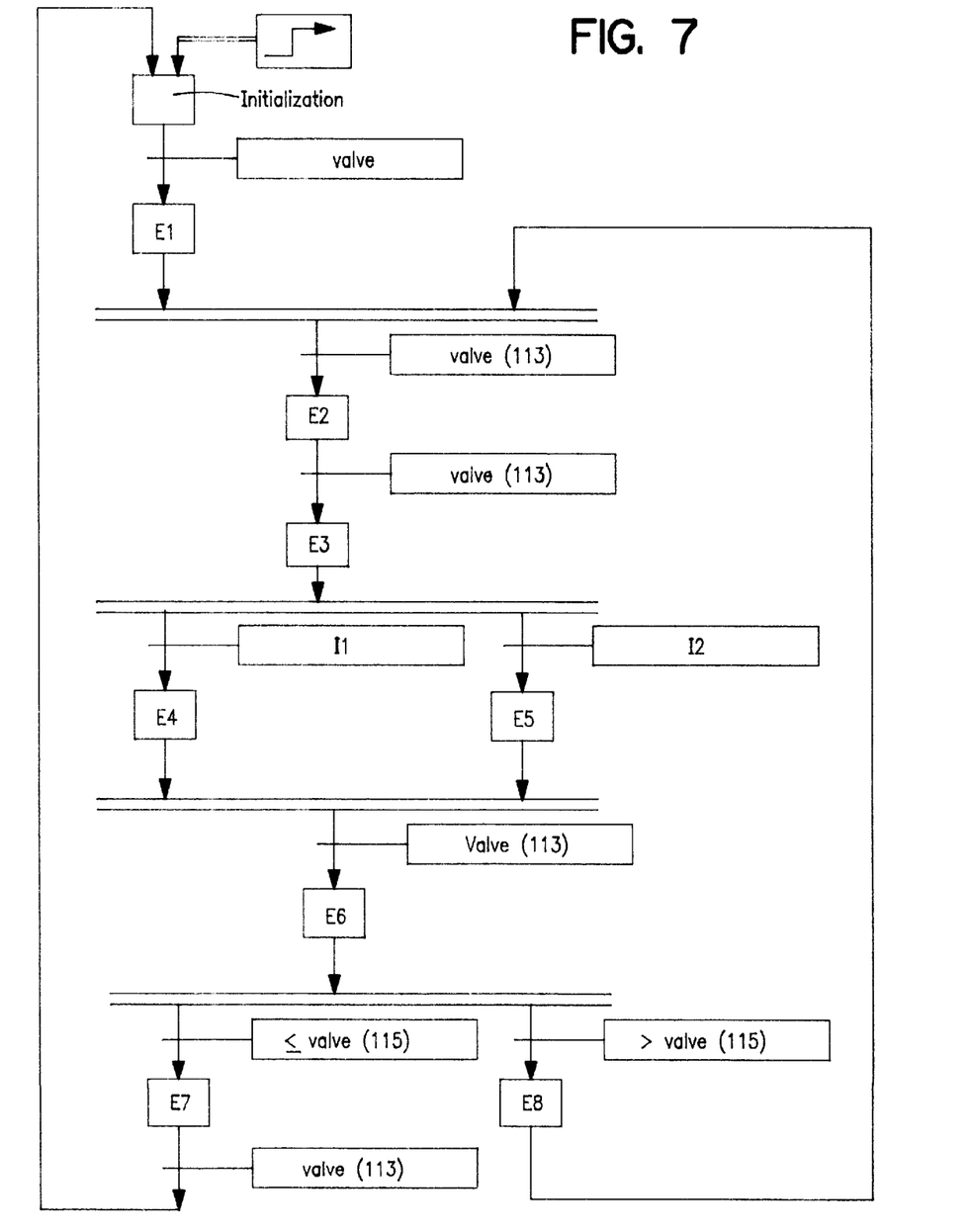
FIG. 7 shows a flow chart of this unit, including the details of FIG. 6.

The Petry diagram of FIG. 7 makes it possible to explain a mode of operation of the sequencer 114. A value contained in the register 113, for which the bits "0" to "3" force a zero value in the counters 111 and 121, validates the passage from an initial step of the sequencer to a step E1.

A step E1, a process run in the module 10, outside the unit 6, has the capability of writing an initial state of the autofocus window in the registers 101, 102, 109, 113 and 115. A value of the register 113 with a low state of the "6" bit validates the passage from step E1 to a step E2.

In step E2, half the sum of the values contained in the registers 101 and 102 is written into the register 103, and then the zero bit of the register 113 is put in the low state to activate the counters 111 and 121. Putting the "0" bit in the low state causes the unit 6 to pass to a state corresponding to a step E3.

In the state corresponding to the step E3, the counter 111 and 121, respectively, accumulate the quantity of activity, here directly assimilable to the heat of the first and second subwindows, respectively, of the autofocus window. The reception of an interrupt signal I1 by the sequencer 114 activates a step E4. The reception of an interrupt signal I2 by the sequencer 114 activates a step E5. The signal I1 generated by the comparator 112 indicates that the heat of the first subwindow has exceeded the threshold contained in the register 109 before the heat of the second subwindow has exceeded this same threshold. The signal I2 generated by the comparator 122 indicates that the heat of the second subwindow has exceeded the threshold contents in the register 109 earlier than that of the first subwindow. A double horizontal line in the Petry diagram of FIG. 7 symbolizes an OR logic for activating steps E4 or E5.

In step E4, the first subwindow is found to be hotter than the second subwindow. The value of the register 103 is written into the register 102 by the sequencer 114, in such a way as to re-define the autofocus window as being equal to the first subwindow. The "0" bit of the register 113 is put in the high state by the sequencer 114 in order to deactivate the counters 111 and 121.

In step E5, the second subwindow is found to be hotter than the first subwindow. The value of the register 103 is written into the register 101 by the sequencer 114, in such a way as to re-define the autofocus window as being equal to the second subwindow. The "0" bit of the register 113 is put in the high state by the sequencer 114 in order to deactivate the counters 111 and 121.

The high state of the "0" bit of the register 113 then activates a step E6, in which the size of the autofocus window is calculated by subtracting the contents of the register 101 from the contents of the register 102. The size thus obtained is compared with the value contained in the register 115. A size less than or equal to the value of the register 115 activates a step E7. A size greater than the value of the register 115 activates a step E8.

In step E7, the autofocus window has converged on a window of minimal size such that at least one window of identical size is not as hot as this window. An interrupt I3 is generated over the bus 7, and the "6" bit of the register 113 is put in a high state, in such a way as to signal the convergence obtained, to allow a process external to the unit 6 to read the content of the registers 101 and 102. The high state of the "6" bit thus replaces the sequencer in its initial step.

In step E8, the autofocus window has not converged on a window of minimal size and the "6" bit of the register 113 is not modified. The value contained in the register 109 is divided by the power of two, encoded by the "4" and "5" bits of the register 113. The fact that it is possible to reduce the threshold value makes it possible to speed up the attainment of the threshold on the part of one of the counters 111 or 121 for the new subwindows determined subsequently. In fact, because the size of the autofocus window decreases after each passage through step E6, it is possible that the quantity of activity associated with this window will take longer to be comparable to that of the preceding autofocus window. The low state of the "6" bit then reactivates step E2. In this way, a loop through steps E2 to E6 is repeated until the passage to step E7.

A process external to the unit 6, activated by the interrupt I3, can consult the value of the "6" bit of the register 113, in order to see whether the autofocus window has converged on one window among the hottest windows. This same process can interrupt the sequencer 114 by setting the "0" bit and the "6" bit of the register 113 at a high state and by writing a zero value in the register 109. It can happen that the heat of the autofocus window will be too low to allow sufficiently fast convergence. The processes can then load other values, more suitable for assuring fast convergence, into one or more of the registers 101, 102, 109, 113 and 115.

It will be appreciated that a process run from outside the unit 6 intervenes only upon starting, stopping or at the end of the course of sequences run by the sequencer 114. This prevents the process run from outside the unit 6 from influencing the measures taken by the unit 6.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the appended claims.

What is claimed is:

1. A data processing machine with nonuniform memory access and cache coherency, constituted by a machine having a memory including a plurality of modules (10, 20, 40, 60) each comprising a physical part of the memory of the machine, one of the given modules (10) including a unit (6) to assure data coherence with other modules (20, 40, 60), characterized in that said unit (6) includes:

a first register (81, 101) adapted to contain a first logical address of the memory, a second register (82, 102) adapted to contain a second logical address of the memory, first means (90, 95, 111, 121, 88, 92, 108) for measuring a quantity of activity relating to data whose addresses are included between said first address and said second address, a third register (83, 93, 109) adapted to contain a threshold value for measuring said quantity of activity, second means (91, 94, 112, 122) for detecting when said threshold value is exceeded by the quantity of activity measured by the first means, and said unit (6) includes a fourth register (103) adapted to contain a third logical address included between said first address and said second address, and that the first means includes a first counter (111) of transactions between said one of the given modules (10) and the other modules (20, 40, 60) relating to the data whose addresses are included between said first address and said third address and a second counter (121) of transactions of the module in question, with the other modules relating to the data whose addresses are included between said third address and said second address.

2. The data processing machine with nonuniform memory access and cache coherency of claim 1, characterized in that the first means include a counter (90) of transactions between said one of the given modules (10) and the other modules (20, 40, 60), relating to the data whose addresses are included between said first address and said second address.

3. The data processing machine with nonuniform memory access and cache coherency of claim 1, characterized in that the first means include a counter (95) of latent periods of transactions between said one of the given modules (10) and the other modules (20, 40, 60), relating to the data whose addresses are included between said first address and said second address.

4. The data processing machine with nonuniform memory access and cache coherency of claim 1, characterized in that the unit (6) includes a fourth register (103), adapted to contain the third logical address included between said first address and said second address, and that the first means include a first counter (111) of latent periods of transactions between said one of the given modules (10) and the other modules (20, 40, 60), relating to the data whose addresses are included between said first address and said third address and a second counter (121) of latent periods of transactions of the module in question, with the other modules, relating to the data whose addresses are included between said third address and said second address.

5. The data processing machine with nonuniform memory access and cache coherency of claim 1, characterized in that the unit (6) includes a sequencer (114) for writing the contents of the fourth register (103) in the second register (102) when the contents of the first counter (111) exceed the contents of the third register (109), for writing the contents of the fourth register (103) into the first register (101) when the contents of the second counter (121) exceed the contents of the third register (109), and for writing a value contained between the contents of the first register (101) and the second register (102) into the fourth register (103).

6. The data processing machine with nonuniform memory access and cache coherency of claim 4, characterized in that the unit (6) includes a sequencer (114) for writing the contents of the fourth register (103) in the second register (102) when the contents of the first counter (111) exceed the contents of the third register (109), for writing the contents of the fourth register (103) into the first register (101) when the contents of the second counter (121) exceed the contents of the third register (109), and for writing a value contained between the contents of the first register (101) and the second register (102) into the fourth register (103).

7. The data processing machine with nonuniform memory access and cache coherency of claim 5, characterized in that the unit (6) includes a fifth register (115) adapted to contain a threshold value for a difference between the contents of the first register (101) and the second register (102), in order to place the sequencer (114) into its initial state when said threshold value exceeds said difference.

* * * * *